(12) United States Patent
Spachtholz

(10) Patent No.: US 10,251,116 B1
(45) Date of Patent: Apr. 2, 2019

(54) METHOD AND DETECTION SYSTEM FOR AUTOMATICALLY DETECTING CELLULAR MOBILE CHANNELS

(71) Applicant: Rohde & Schwarz GmbH & Co. KG, Munich (DE)

(72) Inventor: Andreas Spachtholz, Zangberg (DE)

(73) Assignee: Rohde & Schwarz GMBH & Co. KG, Munich (DE)

(*) Notice: Subject to any disclaimer, the term of this patent is extended or adjusted under 35 U.S.C. 154(b) by 0 days.

(21) Appl. No.: 15/792,567

(22) Filed: Oct. 24, 2017

(51) Int. Cl.
*H04W 24/10* (2009.01)
*H04W 40/02* (2009.01)
*H04W 40/24* (2009.01)
*H04W 48/16* (2009.01)
*H04W 48/18* (2009.01)

(52) U.S. Cl.
CPC ......... *H04W 40/246* (2013.01); *H04W 40/02* (2013.01); *H04W 48/16* (2013.01); *H04W 48/18* (2013.01); *H04W 24/10* (2013.01)

(58) Field of Classification Search
CPC ... H04W 40/246; H04W 40/02; H04W 48/18; H04W 48/16; H04W 24/10
See application file for complete search history.

(56) References Cited

U.S. PATENT DOCUMENTS

| 7,787,431 B2* | 8/2010 | Li | H04L 5/0007 370/343 |
| 2011/0117911 A1* | 5/2011 | Narang | H04W 48/16 455/434 |
| 2012/0252446 A1* | 10/2012 | Reial | H04W 48/16 455/434 |
| 2016/0095012 A1* | 3/2016 | Laukkanen | H04L 5/006 370/252 |

FOREIGN PATENT DOCUMENTS

EP 1569354 A1 * 8/2005 ............. H04B 1/707

* cited by examiner

*Primary Examiner* — Brandon J Miller
(74) *Attorney, Agent, or Firm* — Schwabe, Williamson & Wyatt, P.C.

(57) ABSTRACT

A method for automatically detecting cellular mobile channels of a certain cellular mobile standard and their respective center frequencies is described. A spectrum assigned to said cellular mobile standard is received via at least one receiving antenna. Said spectrum received is automatically analyzed by a detection system. A peak detection is performed during said automatic analysis in order to obtain a list of cellular mobile channels and their respective center frequencies for said cellular mobile standard. Further, a detection system is described.

17 Claims, 1 Drawing Sheet

METHOD AND DETECTION SYSTEM FOR AUTOMATICALLY DETECTING CELLULAR MOBILE CHANNELS

FIELD OF THE DISCLOSURE

Embodiments of the present disclosure relate generally to a method for automatically detecting cellular mobile channels of a certain cellular mobile standard and their respective center frequencies. Further, embodiments of the present disclosure relate to a detection system for automatically detecting cellular mobile channels of a certain cellular mobile standard and their respective center frequencies.

BACKGROUND

For analyzing a certain cellular mobile standard, the respective unknown mobile channels, namely the channel numbers and their exact center frequencies, have to be inquired by the mobile provider, also called mobile (network) operator. Once, the several channel numbers and their center frequencies have been obtained, they have to be entered manually for starting the analyses.

It is inter alia necessary to know the different available channels for analyzing occurring interferences at borders of countries which might occur due to mobile providers of a neighboring country.

Further, the information about the mobile channels is important for determining so-called fingerprints with regard to the roaming coverage such that it is possible to determine which mobile channel at which frequency was receivable at a certain location at a certain moment.

Since mobile providers change their mobile channels frequently due to network planning and optimization of their mobile network, it is necessary to be able to detect all available mobile channels at a certain location in a short time without much effort.

SUMMARY

Accordingly, there is a need for a method as well as a detection system for detecting all available mobile channels of a certain cellular mobile standard at a certain location.

Embodiments of the present disclosure provide a method for automatically detecting cellular mobile channels of a certain cellular mobile standard and their respective center frequencies, with the following steps:
  Receiving a spectrum assigned to said cellular mobile standard via at least one receiving antenna; Automatically analyzing said spectrum received by a detection system;
  and
  Performing a peak detection during said automatic analysis in order to obtain a list of cellular mobile channels and their respective center frequencies for said cellular mobile standard.

Further, embodiments of the present disclosure provide a detection system for automatically detecting cellular mobile channels of a certain cellular mobile standard and their respective center frequencies, comprising a scanner device connected to at least one receiving antenna, said scanner device being configured to automatically analyze a spectrum received via said receiving antenna, said spectrum received being assigned to said cellular mobile standard, said scanner device being configured to perform a peak detection during said automatic analysis in order to obtain a list of cellular mobile channels and their respective center frequencies for said cellular mobile standard.

Accordingly, it is possible to automatically detect the different cellular mobile channels of a certain cellular mobile standard being available wherein the respective center frequencies of these cellular mobile channels are also obtained by analyzing the spectrum received. During the automatic analysis, the spectrum received is analyzed with respect to a peak detection such that a list of cellular mobile channels and their respective center frequencies is obtained for said cellular mobile standard. The list comprises information with regard to valid channel numbers at certain frequencies for the respective mobile cellular standard. For instance, the list comprises the information that the channel number 14 is available at the center frequency of 1.74 GHz for a certain frequency band of the Global System for Mobile Communications (GSM) standard, namely the GSM 1800 frequency band.

During the receiving step of the spectrum, the intensity or rather the power depending on the frequency may be recorded which will be used to calculate a certain spectrum function that depends on the frequency.

According to an aspect, said spectrum received is analyzed by determining an absolute maximum in said spectrum received. For instance, the spectrum function is analyzed with regard to the intensity or rather the power, for instance the distribution and other distinctive characteristics such as the absolute maximum. Hence, the absolute maximum, namely the maximum intensity of the spectrum received, can be used as a reference point for the whole spectrum for identifying further characteristics. The absolute maximum determined may correspond to a cellular mobile channel having the probably best reception properties.

Particularly, said spectrum received is analyzed by determining a maximum threshold, said maximum threshold being defined by said absolute maximum and a predefined loss. The predefined loss corresponds to a certain deviation compared to the cellular mobile channel having the probably best reception properties which is still acceptable. Hence, the other cellular mobile channels with worse reception properties should be within a range between said absolute maximum (upper limit) and said maximum threshold (lower limit).

For instance, said scanner device of said detection system is configured to determine an absolute maximum in said spectrum received, said scanner device being further configured to determine a maximum threshold, said maximum threshold being defined by said absolute maximum and a predefined loss. Thus, the scanner device may be configured to perform the analysis steps mentioned above in order to identify the cellular mobile channel with the probably best reception properties of the respective cellular mobile standard and to determine a certain (intensity) range used for further processing. In this range, the other cellular mobile channels of the cellular mobile standard are expected.

According to another aspect, a step function depending on the frequency of said spectrum received is determined, said maximum threshold being used for defining said step function. The step function is a function that depends on the frequency wherein it is calculated from the spectrum received, namely the spectrum function that also depends on the frequency. In general, a step function is a function having at least two different distinctive values, for instance 0 and 1. Accordingly, a step function may also be called a digital function provided that only two different distinctive values are provided, namely 0 and 1. The step function is used to increase the detection probability of the cellular mobile channels as it classifies the spectrum received in two different values. Hence, the spectrum is divided in interesting parts and parts being not of interest for the further analysis. Further, the step function simplifies an optional and upcoming weighting of the different potential cellular mobile channels.

In the step function, all frequencies may equal 1 that are greater than or equal said maximum threshold whereas the other frequencies may equal 0. Alternatively, all frequencies equal 1 that are greater than said maximum threshold whereas the other frequencies equal 0. In an alternative implementation, all frequencies may equal 0 that are greater than or equal said maximum threshold whereas the other frequencies may equal 1. Alternatively, all frequencies equal 0 that are greater than said maximum threshold whereas the other frequencies equal 1.

The scanner device may be configured to determine a step function depending on the frequency of said spectrum received, said maximum threshold being used for defining said function. Thus, the scanner device is also configured to perform these analyzing steps. The scanner device is enabled to generate the appropriate step function by applying the maximum threshold determined previously. The maximum threshold is used as a condition for defining the step function while separating the different values of the spectrum in interesting parts and parts being not of interest.

Accordingly, the maximum threshold is used for determining the step function which may simplify the spectrum received for further analyzing the available cellular mobile channels.

Another aspect provides that a correlation is done for a respective channel bandwidth of said cellular mobile standard and said step function. For instance, the channel bandwidth is 10 MHz, 15 MHz or 20 MHz for the Long Term Evolution (LTE) cellular mobile standard. This correlation is used in preparation for the peak detection during the automatic analysis.

The peak detection may be done for said correlation. Hence, the correlation function obtained is subjected to the peak detection such that the peaks in the correlation function are determined in order to identify the center frequencies of the probable cellular mobile channels of the cellular mobile standard. The peak detection and, thus, the determination of the respective center frequencies are simplified while taking the correlation function obtained into account such that the whole automatic analysis of the spectrum received is simplified.

Accordingly, the automatic analysis of the spectrum received obtains an optimized correlating step. The correlating step is optimized as the spectrum received is simplified previously by defining a step function representing the spectrum received.

For instance, said scanner device is configured to perform a correlation for a respective channel bandwidth of said cellular mobile standard and said step function, said peak detection being done for correlation. Thus, the scanner device is also enabled to perform these analyzing steps. The scanner device may correlate the respective channel bandwidth of said cellular mobile standard to be investigated and the step function determined previously in order to generate a correlation function. As already described, the scanner device performs the peak detection on said correlation function generated.

Further, a weighted list of potential center frequencies for said cellular mobile standard is generated. This weighted list may be the output of applying the peak detection on the correlation function. The weighting may correspond to the height of the different peaks obtained in the correlation function. Thus, a high peak corresponds to a high weighting since a high peak is deemed to be an evidence that the appropriate center frequency corresponds to a certain cellular mobile channel. In general, the weighted list comprises the different cellular mobile channels as well as their respective center frequencies available. Accordingly, the different cellular mobile channels and their respective center frequencies could be identified by peak detection. The spectrum received could be analyzed with less effort as the weighted list was generated in an easy manner.

For instance, said scanner device is also configured to generate a weighted list of potential center frequencies for said cellular mobile standard. The scanner device is also configured to perform this analyzing step. As the scanner device is enabled to generate the correlation function and to perform peak detection in this correlation function, the weighted list can be provided appropriately.

Moreover, said list of center frequencies may be generated based on said weighted list of potential center frequencies for said cellular mobile standard. The list of center frequencies corresponds to the respective cellular mobile channels of the cellular mobile standard to be investigated. The list may be obtained by sorting the weighted list appropriately.

The scanner device may be configured to generate said list of center frequencies based on said weighted list of potential center frequencies. This means that the scanner device may be enabled to sort the different potential central frequencies with regard to their probability.

Generally, the scanner device may comprise a processing unit being configured to perform the different analyzing steps.

At least one of said list of center frequencies and said weighted list of potential center frequencies may be verified by an evaluation unit. The evaluation unit may be a standard computer or a test scanner that verifies the potential cellular mobile channels due to the potential center frequencies of these channels.

For instance, the list of center frequencies is obtained after the weighted list of potential center frequencies has been verified appropriately.

Accordingly, said detection system may comprise an evaluation device, said evaluation device being connected to said scanner device, said evaluation device being configured to verify at least one of said list of center frequencies and said weighted list of potential center frequencies may be verified by an evaluation unit. Thus, a direct connection between the scanner device and the evaluation device may be provided which ensures that the list of center frequencies of the potential cellular mobile channels can be transferred easily.

Moreover, said list of center frequencies may be displayed on a display. For instance, the detection system, in particular the scanner device and/or the evaluation device, may comprise a display such as a screen for user convenience. On this display, the list of cellular mobile channels and their respective center frequencies may be displayed for informing the user. Thus, a graphical user interface (GUI) may be provided, in particular displayed, wherein a certain channel number is highlighted in a certain color provided that the respective channel number was identified as being available.

Moreover, said list of center frequencies may be post processed by a post processing unit. For instance, the post processing unit may execute a networking engineering or drive test software such as ROMES.

According to another aspect, a predefined set of parameters with regard to said cellular mobile standard is used for automatically detecting said cellular mobile channels of said certain cellular mobile standard. Thus, only frequencies and channel numbers according to the cellular mobile standard to be investigated are taken into account during the receiving step. For instance, the detection system is initially configured to receive the appropriate frequencies that correspond to the respective cellular mobile standard to be investigated. Hence, the overall acquisition time can be decreased wherein the detection probability is increased simultaneously. The respective frequencies as well as channel numbers for the Long Term Evaluation (LTE) standard are different with respect to the ones of the Global System for Mobile Communications (GSM) cellular mobile standard.

Generally, the detection system may be set initially by applying the predefined set of parameters.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

Figure 1:
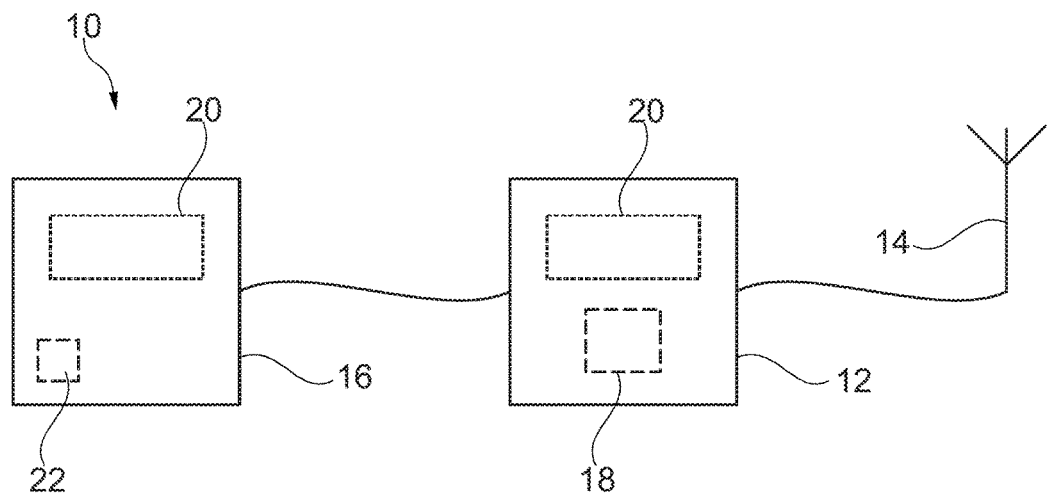
FIG. 1 shows a schematic overview of one representative embodiment of a detection system.

In FIG. 1, a detection system 10 for automatically detecting cellular mobile channels of a certain cellular mobile standard and their respective center frequencies is shown.

The detection system 10 comprises a scanner device 12 that is connected to at least one receiving antenna 14 for receiving a spectrum that is assigned to said cellular mobile standard to be investigated.

Further, the detection system 10 comprises an evaluation device 16 that is connected to the scanner device 12 such that data can be exchanged between the scanner device 12 and the evaluation device 16.

In general, the scanner device 12 comprises at least a processing unit 18 that is configured to process data and to execute algorithm for processing data in an appropriate manner as will be described hereinafter.

Further, the detection system 10 comprises a display 20, for instance a screen, that may be part of the scanner device 12 and/or the evaluation device 16. Generally, the display 20 is configured to display a graphic user interface for providing information to a user of the detection system 10 such as the results of the automatic detection of cellular mobile channels of a certain cellular mobile standard and their respective center frequencies. This will be described hereinafter with reference to FIGS. 1 and 2.

As already mentioned, a spectrum A of the cellular mobile standard is received via the receiving antenna 14 wherein the respective spectrum A is analyzed by the scanner device 12 in an automatic manner. For this purpose, a spectrum function s(f) is obtained that depends on the frequency f. The spectrum function s(f) may be generated by the scanner device 12.

During this automatic analysis, an absolute maximum M in said spectrum received A is determined such that the highest intensity of the spectrum received A is detected. This can be done by the scanner device 12, in particular its processing unit 18.

Then, a maximum threshold T is determined that is defined by the previously determined absolute maximum M and a predefined loss (x dB) which may be defined by the user of the detection system 10. Alternatively or supplementary, the predefined loss is given by the manufacturer of the scanner device 12, in particular wherein the predefined loss can be varied by the user.

Generally, the maximum threshold T is determined by the scanner device 12, in particular its processing unit 18.

Accordingly, a range is defined having the maximum threshold T and the absolute maximum M as the lower limit and the upper limit, respectively.

Thus, the whole spectrum received A is divided into at least two portions, namely frequencies having an intensity higher than the maximum threshold T and frequencies having an intensity being lower than the maximum threshold T.

Figure 2:
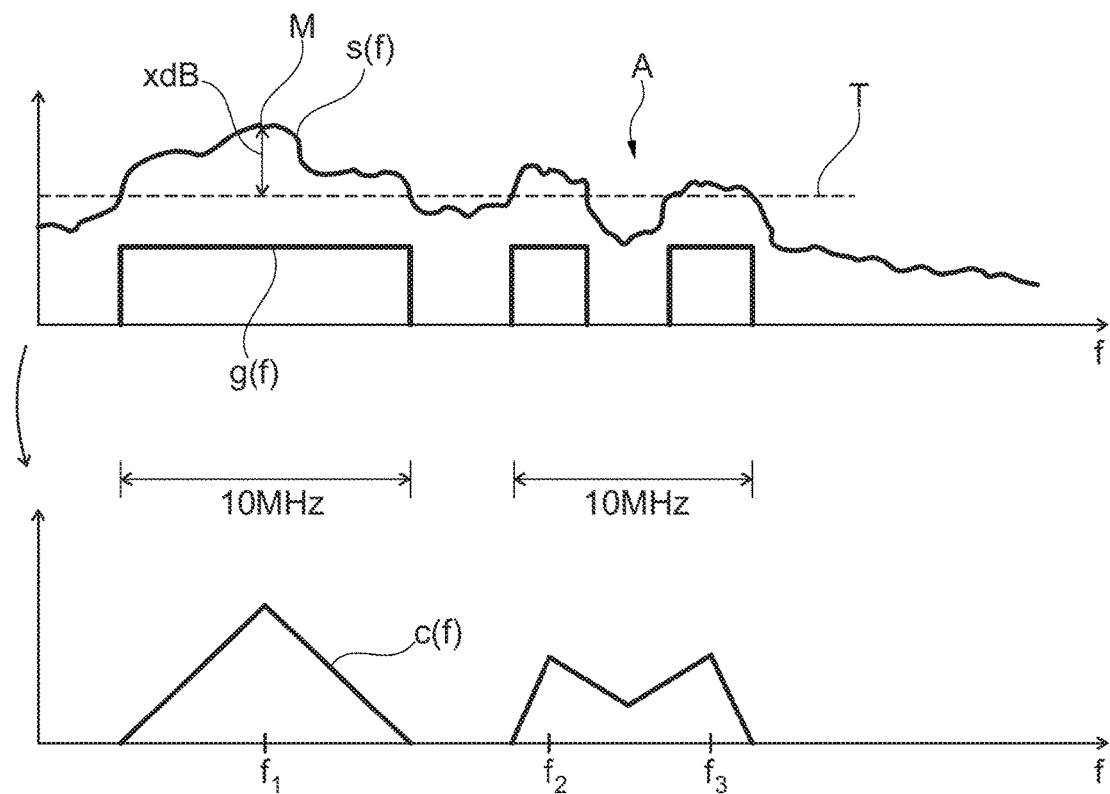
FIG. 2 shows a schematic overview representing an embodiment of a method according to a disclosure.

Afterwards, the scanner device 12, in particular its processing unit 18, may determine a step function g(f) which also depends on the frequency f wherein the maximum threshold T defined earlier is used for defining said step function g(f). For instance, all frequencies equal 1 that are greater than or equal said maximum threshold T whereas the other frequencies equal 0 as shown in FIG. 2. Accordingly, the spectrum received A is simplified appropriately such that the further processing is simplified.

Afterwards, a correlation is done for the respective channel bandwidth of the cellular mobile standard to be investigated and the step function g(f) such that a correlation function c(f) is obtained that also depends on the frequency f. For instance, the channel bandwidth may be 10 MHz, 15 MHz or 20 MHz for a Long Term Evolution (LTE) cellular mobile channel. In the shown embodiment of FIG. 2, a channel bandwidth of 10 MHz is correlated with the step function g(f) in order to obtain the correlation function c(f).

The correlation is done by the scanner device 12, in particular its processing unit 18, such that the scanner device 12, in particular its processing unit 18, is also enabled to generate the correlation function c(f).

The respective correlation function c(f) determined is further analyzed by the scanner device 12, in particular its processing unit 18, wherein a peak detection is carried out. This means that peaks in the correlation function c(f) are detected in an automatic manner wherein the heights of the respective peaks in the correlation function c(f) can be determined.

Hence, a weighted list of potential center frequencies f1, f2, f3 for said cellular mobile standard can be generated that may correspond to respective cellular mobile channels. The weighting corresponds to the probability of the respective cellular mobile channels.

In the shown embodiment, the center frequency f1 has the highest probability since the respective peak is higher than the peaks of the other potential center frequencies f2, f3 due to the different heights of the peaks.

The different potential center frequencies f1, f2, f3 may be sorted according to their probability such that a list of center frequencies is generated. This list can be forwarded to the evaluation device 16 for evaluating the different cellular mobile channels of the certain cellular mobile standard to be investigated by testing the appropriate center frequencies f1, f2, f3.

Alternatively, the (unsorted) weighted list of potential center frequencies is forwarded to the evaluation device 16 for evaluating the potential cellular mobile channels in order to obtain the list of center frequencies that correspond to the available cellular mobile channels of the certain cellular mobile standard.

Hence, at least one of the (unsorted) weighted list of potential center frequencies and the list of center frequencies is verified by the evaluation unit 16 in order to evaluate whether the (potential) cellular mobile channels are available or not.

Hence, the list forwarded to the evaluation unit 16 corresponds to a scan list.

Further, at least one of the weighted list of potential center frequencies and the list of center frequencies is displayed on the display 18 for informing the user of the detection system 10 appropriately. The display 18 generally improves the user convenience.

A positive verification of a certain (potential) cellular mobile channel, which was done by the evaluation unit 16, may be displayed on the display 18, for instance by highlighting the appropriate channel number in green such that the user easily recognizes that the potential cellular mobile channel is available.

In a similar manner a certain (potential) cellular mobile channel may be highlighted in red provided that the potential cellular mobile channel is not available.

Further, the list of center frequencies may be post processed by a post processing unit 22. A software for further investigating the appropriate cellular mobile channels may run on this post processing unit 22. The post processing unit 22 may be a separate device or at least a part of the evaluation unit 16 as shown in FIG. 1.

The automatic detection, in particular the receiving step, may be simplified by using a predefined set of parameters with regard to the cellular mobile standard to be investigated wherein the predefined set of parameters comprise typical frequencies and channel numbers being relevant for the cellular mobile standard to be investigated. Hence, the acquisition time can be reduced wherein the detection probability is increased simultaneously.

Generally, the different analysis steps mentioned above can be performed by the scanner device 12, in particular its processing unit 18.

Accordingly, a method for automatically detecting cellular mobile channels of a certain cellular mobile standard and their respective center frequencies as well as a detection system 10 for doing so are provided which simplify the analysis of a certain cellular mobile standard.

The invention claimed is:

1. A method for automatically detecting cellular mobile channels of a certain cellular mobile standard and their respective center frequencies, with the following steps:
   receiving a spectrum assigned to said cellular mobile standard via at least one receiving antenna;
   automatically analyzing said spectrum received by a detection system,
   wherein said spectrum received is analyzed by determining an absolute maximum in said spectrum received, and
   wherein said spectrum received is analyzed by determining a maximum threshold, said maximum threshold being defined by said absolute maximum and a predefined loss; and
      performing a peak detection during said automatic analysis to generate a list of center frequencies for respective cellular mobile channels for said cellular mobile standard.

2. The method according to claim 1, wherein a step function depending on the frequency of said spectrum received is determined, said maximum threshold being used for defining said step function.

3. The method according to claim 2, wherein a correlation is done for a respective channel bandwidth of said cellular mobile standard and said step function.

4. The method according to claim 3, wherein said peak detection is done for said correlation.

5. The method according to claim 1, wherein a weighted list of potential center frequencies for said cellular mobile standard is generated.

6. The method according to claim 5, wherein said list of center frequencies is generated based on said weighted list of potential center frequencies for said cellular mobile standard.

7. The method according to claim 5, wherein at least one of said list of center frequencies and said weighted list of potential center frequencies is verified by an evaluation unit.

8. The method according to claim 1, wherein said list of center frequencies is displayed on a display.

9. The method according to claim 1, wherein said list of center frequencies is post processed by a post processing unit.

10. The method according to claim 1, wherein a predefined set of parameters with regard to said cellular mobile standard is used for automatically detecting said cellular mobile channels of said certain cellular mobile standard.

11. A detection system for automatically detecting cellular mobile channels of a certain cellular mobile standard and their respective center frequencies, comprising:
   a scanner device connected to at least one receiving antenna, said scanner device being configured to automatically analyze a spectrum received via said receiving antenna, said spectrum received being assigned to said cellular mobile standard, said scanner device being configured to determine an absolute maximum in said spectrum received, said scanner device being further configured to determine a maximum threshold, said maximum threshold being defined by said absolute maximum and a predefined loss, said scanner device being configured to perform a peak detection during said automatic analysis to generate a list of center frequencies for respective cellular mobile channels for said cellular mobile standard.

12. The detection system according to claim 11, wherein said scanner device is configured to determine a step function depending on a frequency of said spectrum received, said maximum threshold being used for defining said step function.

13. The detection system according to claim 12, wherein said scanner device is configured to perform a correlation for a respective channel bandwidth of said cellular mobile standard and said step function, said peak detection being done for said correlation.

14. The detection system according to claim 11, wherein said scanner device is configured to generate a weighted list of potential center frequencies for said cellular mobile standard.

15. The detection system according to claim 14, wherein said scanner device is configured to generate said list of center frequencies based on said weighted list of potential center frequencies.

16. The detection system according to claim 14, wherein said detection system comprises an evaluation device, said evaluation device being connected to said scanner device, said evaluation device being configured to verify at least one of said list of center frequencies and said weighted list of potential center frequencies.

17. The detection system according to claim 11, wherein said detection system comprises a display.

\* \* \* \* \*